United States Patent Office 2,801,730
Patented Aug. 6, 1957

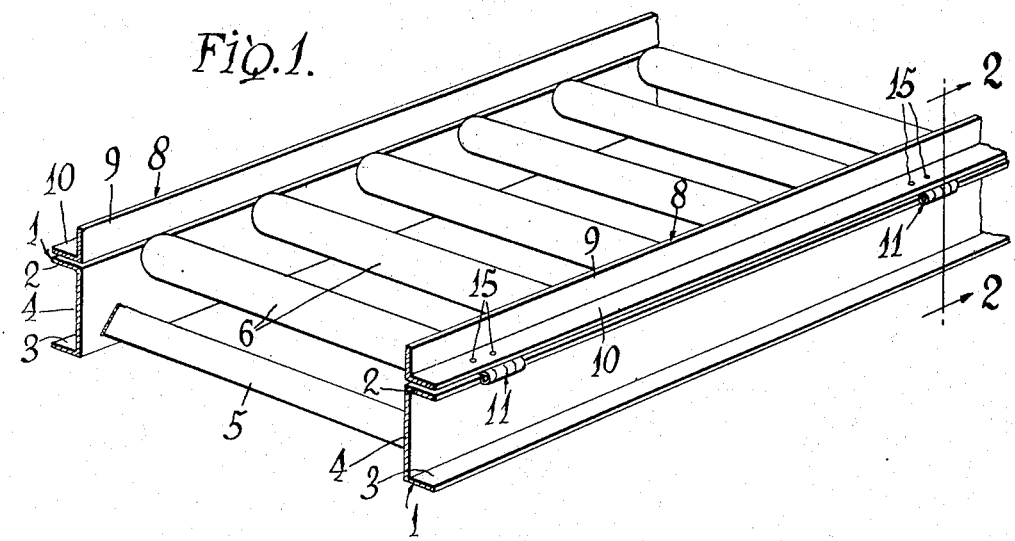
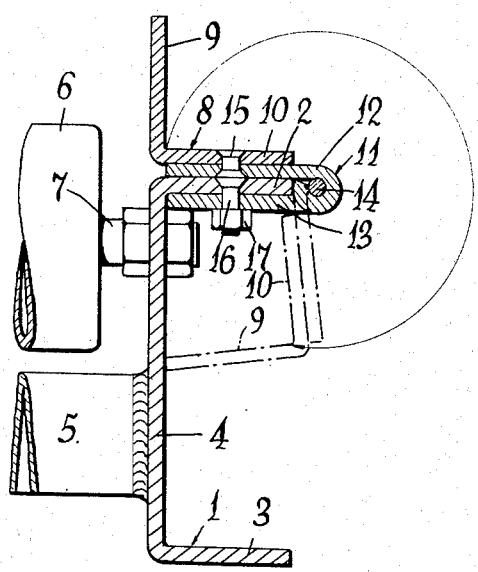
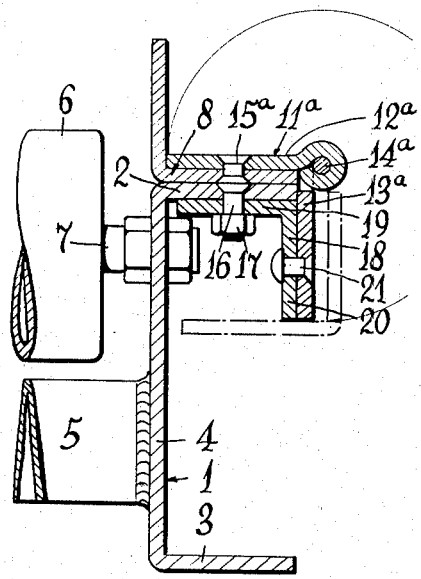

2,801,730

GUARD EQUIPMENT FOR ROLLER TYPE CONVEYORS

Robert R. Strickler, Buffalo, N. Y., assignor to J. A. Webb Belting Company, Inc., Buffalo, N. Y., a corporation of New York Application July 30, 1956, Serial No. 601,087

3 Claims. (Cl. 198—204)

This invention relates to improvements in conveyers of the type which include a frame having connected parallel side bars of channel cross section with their flanges extending laterally outward from the webs and load supporting elements mounted between the side bars upon transverse axles or shafts extending between and supported by the webs.

As a matter of brevity and convenience conveyers so characterized are referred to in this description and in the claims as of the "roller type"; this designation comprehending cylindrical rollers as the direct load supporting elements, a plurality of wheels on each axle as the direct load supporting elements, such wheels being the mechanical equivalent of the rollers and being comprehended within the designation "rollers" and belts as load carrying elements, the belts being supported by and movable along a series of rollers. The designation "roller type" also comprehends gravity conveyers in which freely rotatable rollers or spaced wheels are the direct supporting elements, "live roller" conveyers in which the rollers as the direct supporting elements are positively driven and power conveyers in which belts are used as the load carrying element and are maintained under suitable tension by the rollers at the ends of the series, one of which is positively driven.

Conveyers of the roller type as above defined are made in alining connected sections, usually of ten feet in length, the number of sections of course depending on the length of the conveyer which in many installations will be of the order of two hundred feet. The utility of conveyers of the roller type includes the transport of the load from point to point on the same floor in which case the load travels along a horizontal path or for tiering or the transport of the load from one floor to another in which cases the conveyer includes one or more sections supported at an appropriate angle of inclination and along which the load may move in either an upward or a downward direction, the path of load movement thus having components of horizontal travel and one or more components of inclined travel. The conveyers are supported from the floor or ceiling by means suitably connected to or cooperating with the roller carrying frame, such, for example, in the case of floor support, as wheeled dollies for the purpose of portability, or tripods or other forms of stands having elements which may be connected to the lower flanges or web of the frame bars or may have supporting engagement with the transverse parts by which the frame bars are connected and braced.

In all cases the rollers extend above the upper flanges of the frame side bars and therefore support the load in a plane which is above or beyond the common plane of the upper flanges of the frame side bars. This is required for the reason that the units of the load, in whatever positions they may have when placed upon the conveyer, are in many cases of greater transverse dimension than the mutual spacing of the frame side bars and hence will project laterally beyond the ends of the rollers at one or both sides of the conveyer and over and above and beyond one or both of the frame side bars, these load units for convenience being referred to as "wide" units. On the other hand many of the load units, which may for convenience be called "narrow" units, are of substantially less transverse dimensions than the mutual spacing of the frame side bars and will be positioned upon the conveyer along lines well intermediate the frame side bars.

Many of the narrow units are pipes or tubes or other objects of cylindrical contour, and as placed on the conveyer in more or less longitudinal directions will tend to roll in a lateral direction and since there is no obstruction to such lateral displacement will roll beyond the sides of the conveyer and drop to the floor with liability of damage from the fall and with the results of impairment of the transport capacity of the conveyer and waste of the workmen's time and effort in picking them from the floor and making such disposal of them as may be required which, according to inspection, may be their replacement upon the conveyer or their rejection and storage elsewhere. In the daily operation of such conveyers for the transport of narrow load units the resultant losses are in serious degree.

The invention therefore proposes guard equipment for roller type conveyers for the purpose of preventing the displacement of narrow load units.

The principal object is to provide guard equipment which is compatible with the use of the conveyer for both wide and narrow load units, the equipment being so constructed and attached to the frame side bars as to have instantly and easily effected selective placement in active or inactive positions. In the active position the equipment presents lateral obstacles which limit the rolling of the narrow units and prevent their displacement beyond the sides of the conveyer and in the inactive position the obstacles are removed and the conveyer is available for wide load units.

A further object is to provide guard equipment of simple and inexpensive character which may be quickly attached to and removed from the side frame bars of any straight section of the conveyer and securely supported in either of its active or inactive positions.

A further object is to provide guard equipment which at negligible expense may be attached to the side frame bars of roller type conveyers at the places where they may be in use, and which may be included as parts of the conveyer in connection with its original manufacture or may be furnished as accessory parts for conveyers already in use.

A further object is to provide guard equipment which as attached to the side frame bars of the conveyer does not increase the width of the conveyer and therefore does not require any additional floor space.

In the drawings:

Figure 1 is a sectional perspective view of a section of a gravity conveyor to which guard rail equipment embodying the features of the invention is applied, the equipment being shown in its active position.

Figure 2 is a partial vertical cross section on the line 2—2 of Figure 1, the guard equipment being shown in its active position in full lines and in its inactive position in broken lines.

Figure 3 is a partial vertical cross section in the same plane as Figure 2 and showing an alternative construction with the parts in the same relation as in Figure 2.

The conveyor frame includes parallel side bars 1 of channel cross section having upper and lower outwardly directed flanges 2 and 3 and a vertical web 4 extending between the flanges. The side bars 1 are connected and braced by transverse bars 5 which, for a section ten feet in length, are usually provided in a series of four equidistantly spaced. In the example selected for illustration the connecting bars 5 are of inverted V-shape in cross section and are secured to the webs 4 by welding. As of this cross section, the bars 4 conform in outline to supporting saddles (not shown) upon which they rest, these saddles being provided at the upper ends of vertical standards which form parts of tripods or other supporting frames, all as well known in the art. The conveyor is completed by transverse load supporting rollers 6 which extend between the webs 4 and are mounted on axles 7 having end portions which project beyond the rollers and are secured for support to the webs 4 in the well known manner. The rollers 6 project to a suitable extent above the upper flanges 2 in order that the conveyor may carry load units of greater transverse dimension than the conveyor width, i. e., wide load units.

The guard equipment of the invention includes a guard element 8 in association with the upper flange 2 of each side of the frame bar 1 and mounted for selective placement in the active or inactive positions above referred to. The element 8 includes a guard wall 9 and a mounting wall 10 in right angular relation to the wall 9 and is preferably in the form of an angle iron. In the active position of the guard element 8, the wall 9 extends vertically upwardly from the associated frame bar 1 and is preferably substantially co-planar with the web 4 and the wall 10 extends outward from the wall 9 and is located above and parallel to the upper flange 2 of the associated frame bar. In the inactive position o fthe guard element, as shown in broken lines in Figure 2, the mounting wall 10 is pendant in a substantially vertical position from the flange 2 adjacent its edge and the guard wall 9 has a substantially horizontally position in which it projects toward the web 4. Each guard element 8 is carried by two or more brackets 11 spaced along the length of the guard element at suitable intervals. Each bracket 11 consists of an upper plate 12 and a lower plate 13. In the active position of the guard element, the plate 12 extends horizontally and is located above the flange 2 of the associated side frame member. The plates 12 and 13 are formed to provide a connecting hinge joint located adjacent the edge of the flange 2 and which is completed by a pin 14. The plate 13 is connected in fixed relation to the flange 2 and the plate 12 is movable about the pin 14 as an axis from the active position shown in full lines in Figure 2 to the inactive position shown in broken lines. In the preferred construction shown in Figure 2, the mounting wall 10 rests upon the plate 12 and is rigidly connected to it, preferably by rivets 15, and the plate 12 rests upon the flange 2. The plate 13 is located under and in adjoining relation to the flange 2 to which it is rigidly and, preferably, detachably connected. For this purpose the flange 2 is formed with two openings between its upper and lower faces, each having an upper countersunk portion, and posts 16 extend through the openings and have upper supporting heads which fit conformably in the countersunk parts of the opening, the posts projecting to a suitable extent below the flange 2 and having terminal threads. The plate 13 adjoins the lower face of the flange 2 and has openings through which the posts 16 extend, the attachment of the plate 13 to the flange 2 being completed by nuts 17 upon the lower ends of the posts. When the use of the guard elements is required the operator inserts a finger behind the wall 10 at one end of each element and moves the element from the broken line position shown in Figure 2 to the active position shown in full lines. In this position the guard walls 9 will positively prevent the lateral displacement of the narrow load units. When the use of the guard elements is not required the operator grasps the wall 9 and swings the guard element from its active position to its inactive position shown in broken lines in Figure 2. The change in the position of the guard element is effected, without effort, in a moment of time.

If it be desired to remove the equipment from the conveyer all that is required is to remove the nuts 17 from the posts 16 whereupon the guard element with the brackets 11 attached to it may be freely removed from the flanges 2.

In the construction shown in Figure 2 the bracket plate 12 rests upon the flange 2 and extends between it and the mounting wall 10. For use in cases where a preference may be expressed for the wall 10 to have direct support for its full length upon the flange 2 the alternative form shown in Figure 3 may be used, this form being merely a colorable variation of the form shown in Figure 2. In the construction shown in Figure 3 the bracket means for the connection of the guard element to the flange 2 consists in each instance of two connected brackets, one of which 11a corresponds to the bracket 11 shown in Figure 2 and consists of a plate 12a, a plate 13a and a hinge connection between the plates which is completed by a pin 14a, the hinge connection being adjacent the edge of the flange 2. In this construction the wall 10 rests directly upon the flange 2 and the plate 12a adjoins the upper face of the wall 10 to which it is connected by rivets 15a. The plate 13a extends vertically downward from the hinge connection and is fixed to a second bracket 18 of angle iron cross section, the horizontal flange 19 of the bracket 18 adjoining the lower face of the flange 2 and the vertical flange 20 of the bracket 18 being connected to the plate 13a by rivets 21. The flange 19 is detachably connected to the flange 2 in the same manner that the plate 13 is connected in the construction shown in Figure 2, that is to say by the posts 16 and the nuts 17. The active and inactive positions of the guard element 8 are the same as in the construction shown in Figure 2, the guard element being changed from one position to the other by its movement about the pin 14a as an axis. The wall 9 extends at its ends beyond the bracket connections and in changing the position of the guard element the operator grasps the wall at either end and swings the guard element in the appropriate direction. The guard equipment shown in Figure 3 may be applied to and removed from the flange 2 in the same manner and with the same facility as the guard equipment shown in Figure 2.

I claim:

1. For use with roller type conveyers including side frame bars having upper and lower outwardly extending horizontal flanges and vertical webs between the flanges, transverse connections between the frame bars, transverse axles extending between the frame bars with their ends mounted in the webs and rollers mounted upon the axles with their peripheries extending above the upper flanges of the frame bars, guard equipment associated with a frame bar and comprising, in combination: a guard element of angle iron cross section having a guard wall and a mounting wall in angular relation to the guard wall and brackets in spaced relation along the length of the guard element connecting the guard element to the upper flange of the associated frame bar and consisting of plates and a hinge connection between them adjacent the edge of the upper flange, one of the plates adjoining and being fixedly connected to the mounting wall and means of connection between the other plate and the upper flange of the frame bar, the guard element having an active position in which its guard wall extends upwardly relatively to the associated frame bar and beyond the peripheries of the rollers, thereby to present an abstacle which positively prevents rolling displacement of narrow load units from the conveyer and an inactive position in which its guard wall extends under the upper flange and toward the web.

2. Guard equipment as set forth in claim 1 wherein in the active position of the guard element the plate which is connected to the mounting wall extends under the mounting wall and rests upon the upper flange of the frame bar and the other plate extends under and in adjoining relation to the upper flange of the frame bar.

3. Guard equipment as set forth in claim 1 wherein in the active position of the guard element the plate which is connected to the mounting wall extends above it in adjoining relation and the mounting wall rests upon the upper flange of the associated frame bar and the other plate extends downward from the hinge connection, and a bracket of angle iron cross section has a horizontal flange which is connected to the upper flange of the frame bar and adjoins its lower face and a downwardly extending vertical flange which adjoins and is connected to the downwardly extending plate.

References Cited in the file of this patent

UNITED STATES PATENTS

| | | |
|---|---|---|
| Re. 23,079 | Woldring et al. | Jan. 11, 1949 |
| 2,422,726 | Goldacker | Jan. 24, 1947 |